June 10, 1941.  H. W. HAPMAN  2,245,073
CONVEYER-ELEVATOR
Filed April 19, 1940    6 Sheets-Sheet 1
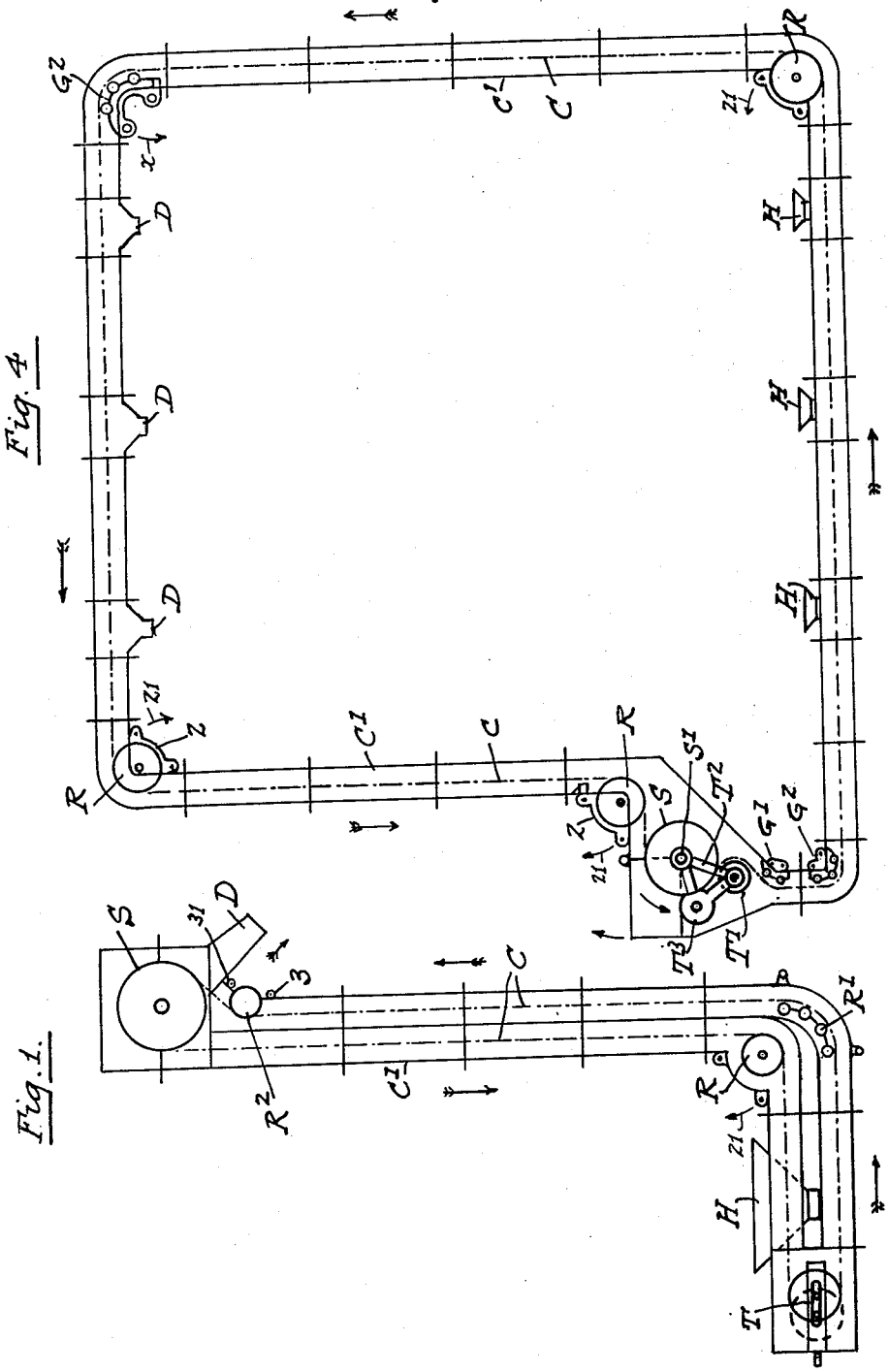
Inventor —
Henry W. Hapman

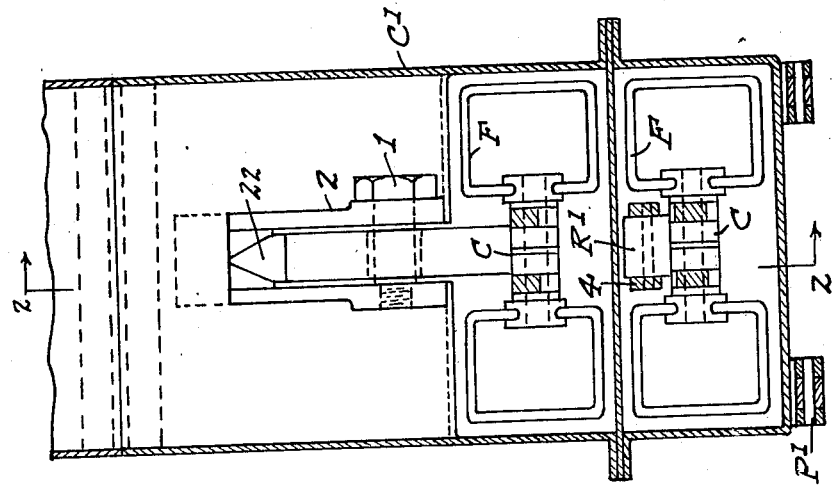
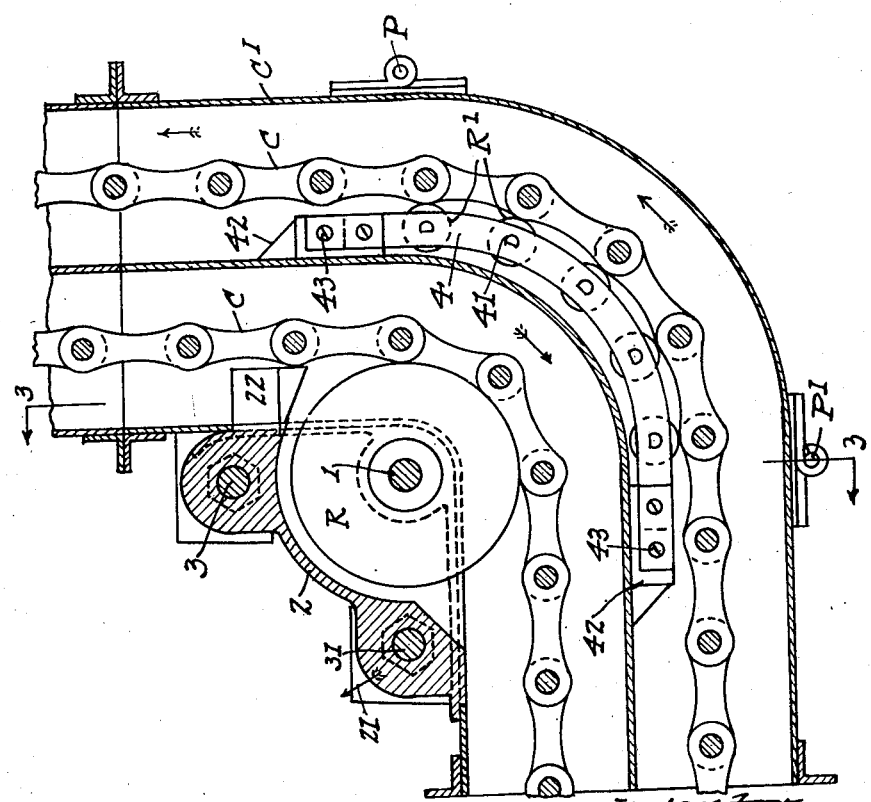

June 10, 1941.  H. W. HAPMAN  2,245,073
CONVEYER-ELEVATOR
Filed April 19, 1940  6 Sheets-Sheet 3
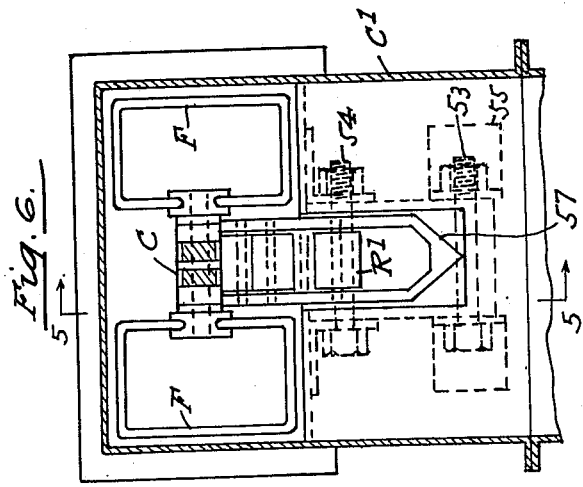
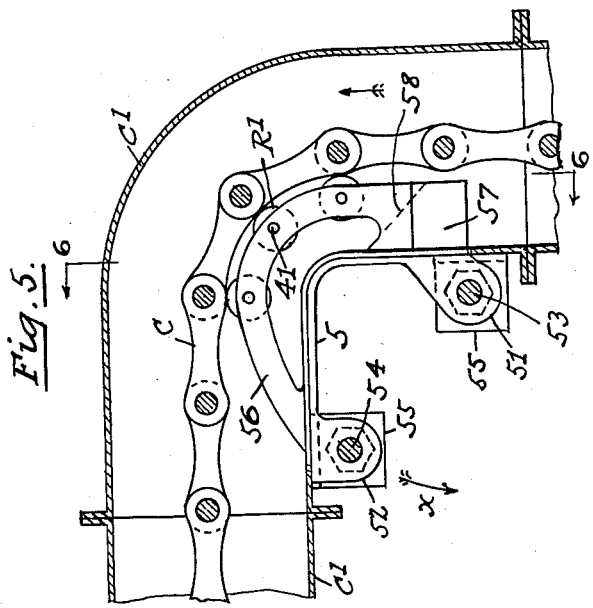
Inventor—
Henry W. Hapman

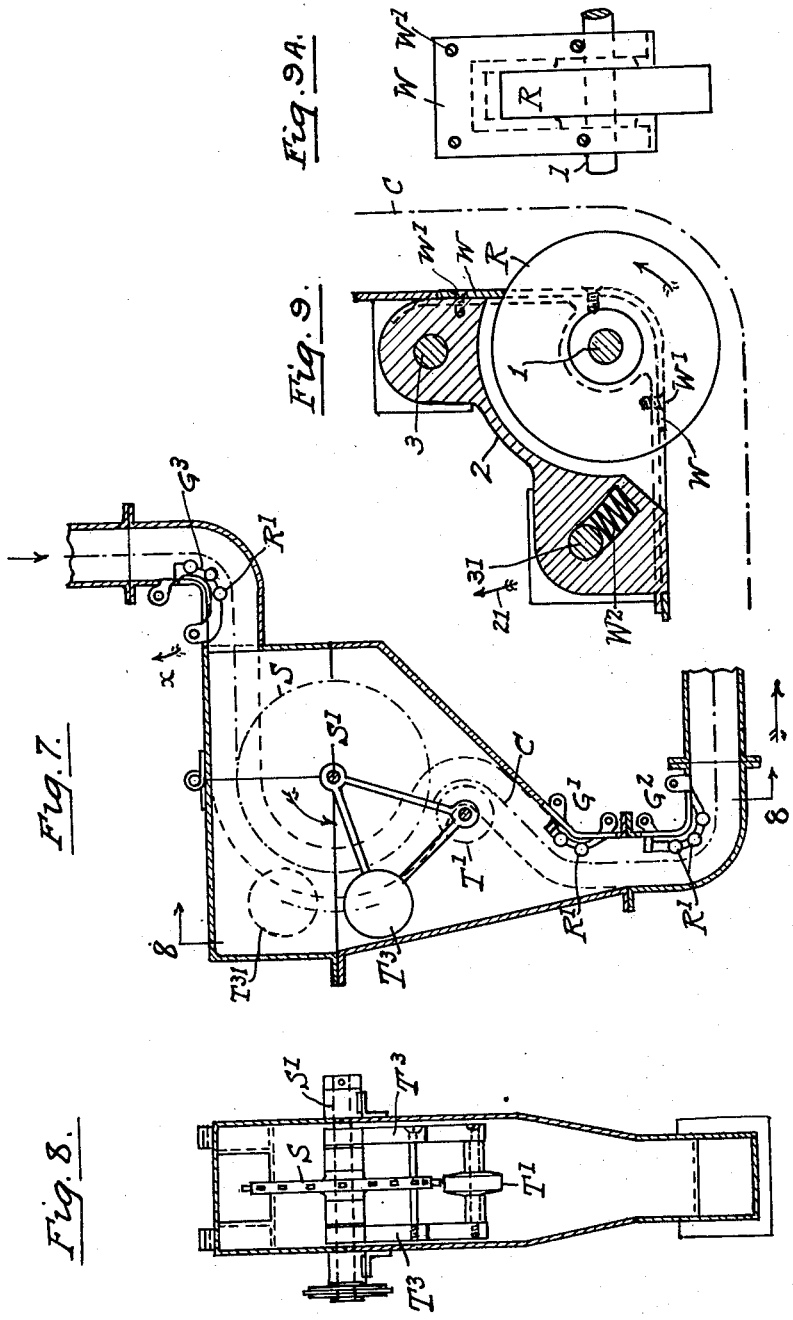

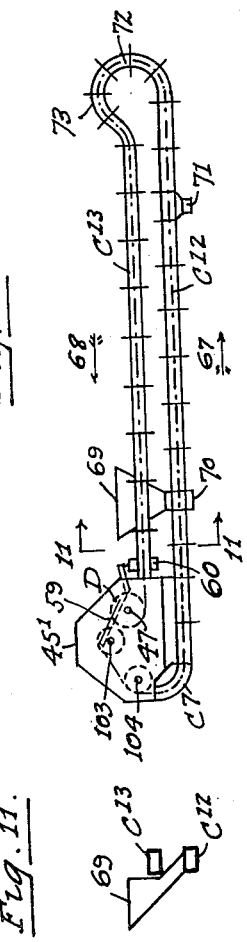

June 10, 1941.  H. W. HAPMAN  2,245,073
CONVEYER-ELEVATOR
Filed April 19, 1940  6 Sheets-Sheet 6

Inventor –
Henry W. Hapman

Patented June 10, 1941

2,245,073

UNITED STATES PATENT OFFICE 2,245,073

CONVEYER-ELEVATOR

Henry W. Hapman, Detroit, Mich.

Application April 19, 1940, Serial No. 330,512

4 Claims. (Cl. 198—168)

My invention relates to conveying and elevating apparatus of the flight type, which consists essentially of a fixed casing having moving elements therewithin and which are adapted for handling in bulk condition loose, granular, or pulverulent materials such as cement, coal, sand, and other minerals, as well as grain, legumes, chemicals, and so forth, and its principal object is to provide an apparatus of the character referred to which may be made up from standard sections, which may be manufactured economically by mass production methods, and which may be installed with a minimum of labor and laying out work.

Another object of my said invention is to provide an apparatus which may be adapted with equal facility for conveying materials in a horizontal, vertical, or inclined direction so as to meet all possible requirements of the material handling field.

Another object of my invention is to provide an apparatus in which the stationary casing is kept full of material throughout its entire operative length, thereby handling material such as coal with a minimum of breakage and depreciation; eliminating the possibility of explosions, and affording the maximum capacity in relation to the size of the casing while operating at comparatively slow speed.

Another object of my invention is to provide an apparatus in which the pull upon the moving elements is applied upon their axis or geometric center, whereby eccentric loading is avoided and a maximum capacity is obtained for a given strength of the parts, whereby also friction of the parts is reduced to a minimum so that the apparatus is capable of operating continuously over long periods without attention or repairs, whereby further, a minimum amount of power is consumed.

Another object of my invention is to provide a propelling chain, the links of which have opposed concave edges so that either edge of the chain is made to negotiate curves by providing at the turns a single large roller of proper radius, or a series of smaller rollers positioned upon a similar radius, upon which the edges of the links may travel. By thus supporting the chain itself upon the rollers, undue strain and friction upon the flights is avoided. By this construction also, in cases where the load upon the chain is relatively light and where sticky material is to be handled, solid slide castings of a radius corresponding to that of the concave edges of the links may be provided at the turns instead of the rollers just mentioned.

Another object of my invention is to provide an apparatus in which all moving parts are enclosed so as to obtain the greatest safety of operation and eliminate all of the usual hazards, which also may be loaded effectively in any part of a horizontal or vertical run, and two different materials such as coal and ashes, for example, may be handled in different sections of the apparatus. Further, due to this construction, my device operates with a minimum noise, and leakage or spillage of material is avoided.

Still another object of my invention is to provide an apparatus in which the several sections of the casing are made symmetrical about their center line so that they may be turned over or reversed when one side becomes worn.

Another object is to provide a system of moving elements in which the flights or propellers are resiliently held upon the operating chain so that they can adapt themselves to inequalities without undue strain upon the parts, and also the material may be fed into or discharged from the apparatus at any point upon horizontal runs or inclines 45° or less from horizontal. One example of such a system is shown and described in my prior United States Patent No. 2,130,492, issued September 20, 1938.

Another object of my invention is to provide a conveyer-elevator from which material may be discharged at any point upon horizontal, inclined, or vertical runs, more especially when using flights of the open type similar to those described in my two pending applications, Serial No. 306,907, filed November 30, 1939, since matured into Patent No. 2,235,992 and Serial No. 316,706, filed February 1, 1940.

Still another object of my said invention is to provide an apparatus of the character referred to in which the usual guide sprockets on curves or return ends, except at driving points, are replaced by rollers or other supports over which the links of the propelling chain are arranged to slide freely although such rollers or supports may be submerged in the mass of material being transported. Incidental to this construction are provided means for preventing jamming of material around the rollers and means for affording easy and quick access to the same for inspection, lubrication and repairs.

Still another object of my invention is to provide the single rollers above mentioned, which are partly submerged within the turns of the casing, with special housings having replaceable wearing plates which maintain close fits around the rollers on the loaded runs and with shrouds adapted to divert dribbling material away from the chain on empty return runs.

Still another object of my said invention is to provide a special construction of the casing at turns, and swingable roller housings therewithin, whereby the said rollers, positioned entirely within the casing, are easily and quickly accessible for inspection, lubrication and repairs.

Still another object of my invention is to provide, on heavy duty conveyer-elevators, where rigidly mounted rollers are employed upon the turns, a special construction of casing having hinged sections for giving access to the said rollers.

With these and other objects in view, I will now describe several preferred embodiments of my invention, reference being had to the accompanying drawings, in which—

Figure 1 is a diagrammatical elevation showing my improved apparatus as applied to a conveyer-elevator for picking up material at its lower end and discharging the same at the top or at an intermediate point.

Figure 2 is a fragmentary vertical section drawn to an enlarged scale showing the rollers employed for guiding the conveyer chain around the curves at the bottom of Figure 1, the section being taken approximately on the line 2—2 of Figure 3.

Figure 3 is a fragmentary section taken on line 3—3 of Figure 2.

Figure 4 is a diagrammatical elevation showing my improved apparatus as used for picking up material at various horizontally spaced points along the floor level and discharging the same at various points upon the upper level.

Figure 5 is a fragmentary vertical section drawn to an enlarged scale showing the arrangement of guide rollers in the upper right hand corner of Figure 4, the section being taken approximately on line 5—5 of Figure 6.

Figure 6 is a fragmentary section of the same taken approximately on line 6—6 of Figure 5.

Figure 7 is a fragmentary vertical section drawn to enlarged scale showing the drive sprocket and automatic take-up indicated on the lower left hand corner of Figure 4, together with the rollers for guiding the chain around the said corner.

Figure 8 is a vertical section of the same taken approximately on line 8—8 of Figure 7.

Figure 9 is a fragmentary vertical section showing a guide roller housing with stripper plate, and Figure 9A shows the plate.

Figure 10 is a diagrammatical elevation drawn to a reduced scale showing a simple form of horizontal conveyer for heavy duty constructed in accordance with my invention in which the feed and discharge hoppers are both positioned upon the lower run or level.

Figure 11 is a transverse section on line 11—11 of Figure 10 showing the arrangement of the feed hopper.

Figure 12 is a side elevation drawn to reduced scale showing a simple form of vertical conveyer or elevator constructed in accordance with my invention and adapted for heavy duty.

Figure 13 is a fragmentary side view of the upper end of the same taken on line 13—13 of Figure 12.

Figure 14 is a transverse section taken on line 14—14 of Figure 12 showing the construction of the casing at points where the upward and downward runs are positioned closely together.

Figure 15 is a fragmentary vertical section showing the discharge hopper at the upper end of Figure 12, as well as the rollers for guiding the chain at that point.

Figure 16 is a similar section showing a casing having a 45° curve in which the chain is guided upon solid slide castings which are substituted for the rollers.

Figure 17 is a transverse section of the casing shown in Figure 16, taken on line 17—17.

Like characters designate corresponding parts throughout the several views, and plain arrows, unless otherwise designated, indicate the direction of flow of the material.

Figure 18:
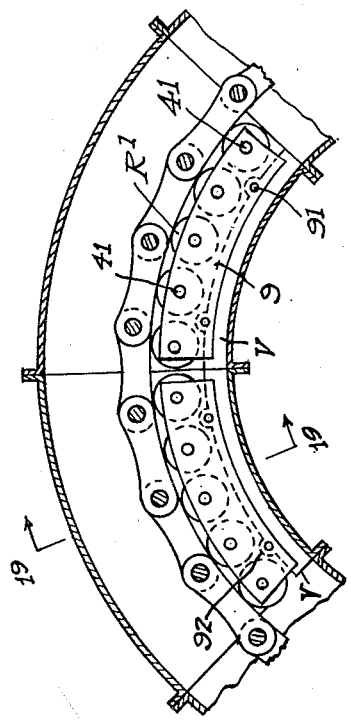
Figure 18 is a fragmentary vertical section showing the curved conduit and the guide rollers in Figure 15 but drawn to enlarged scale so as to afford further detail.

Referring now more particularly to Figures 1, 2 and 3 of the drawings, H indicates the feed hopper by which the material is directed to the lower run, and D designates the discharge hopper, while S shows the driving sprocket operated by conventional means such as an electric motor or other source of power through suitable gearing, not shown. T is the take-up device for adjusting the tension upon the propelling chain, which in the present case takes the ordinary screw and nut form. In Figures 2 and 3 are shown on an enlarged scale the rollers for guiding the propelling chain around curves at the lower right hand corner of Figure 1. The links from which the chain C is formed have opposed concave edges as shown, and these edges, upon the downward run, pass around a roller R of such radius as to conform to the curvature of the concave links. The roller R rotates on a pivot 1 in a hollow housing 2, the said housing being held in position by pivots 3, 31, the pivots being located outside of the casing C' as shown so that, by removing the pivot 31, the housing may be swung outwards in the direction of the arrow 21 so as to expose the roller R and the interior of the housing for inspection, lubrication and repair. The housing 2 is provided with an upwardly pointed V-shaped shroud 22 by which particles of material dribbling from the downward run are directed away from the roller R, thus preventing undue friction between the chain and the said roller. The upward run of the chain is guided by a series of small rollers R' rotatably supported upon pins 41 which extend between side bars 4, the side bars being connected to the middle wall of the casing as by the brackets 42 and screws 43. It will be noted that the supporting bars 4 are spaced at some distance away from the adjacent face of the casing to which they are attached, by which means accumulation of dead material around the rollers is prevented. In order to provide access to the rollers R' the outer portion of the casing is carried on pins P, P' in such manner that, by removing one of the pins, that section of the casing may be swung outwards, thereby uncovering the chain and the rollers. In the section Figure 3 are shown the links of the chain C together with the attached flights F which are in general of the open type as shown in my Patent No. 2,235,992. Supporting the upper run of the chain near to the drive sprocket is a single roller R2 similar in general to the roller R just described but without the shroud 22. The upper half of the casing, above the drive sprocket S, is removable by means of the diametrically opposed flanges shown in Figure 1.

In Figure 4 of the drawings is shown a conveyer-elevator in which material is supplied to the lower run through feed hoppers H and discharged upon the upper horizontal run through hoppers D, whereby it is conducted to a series of bins or other containers. Proximate to the lower left hand corner of this conveyer is a drive sprocket S of similar construction to that above described, and upon the shaft S' of this sprocket is mounted an automatic gravity take-up which comprises a take-up roller T rotatably mounted in a frame T2 upon which frame is a weight T3 which tends constantly to force the roller T in the proper direction to tighten up the propelling chain. An enlarged drawing of this take-up is shown in Figures 7 and 8 in which T3 is the weight shown in solid lines and T31 is the same weight in the upper position of its travel, that is to say, at the beginning of its operation with a newly adjusted chain.

After passing over the take-up roller T the chain shown in dotted lines and designated C passes downwards over two series of multiple roller guides G', G2, the guide G' having two rollers R' of the kind described with reference to Figures 2 and 3 of the drawings, while the guide G2 has three rollers in the series, the difference being due to the arc of curvature of the chain, the lower guide G2 being adapted for 90 degree turns. The right angle turn of the chain above the sprocket S is also carried on a multiple roller guide G3, as shown in Figure 7, although in the small diagram Figure 4, this portion of the chain is carried on a single roller R held in a swingable housing 2 similar to that shown in the left hand portion of Figure 2. Either of these guide means may be used in this particular position. In the upper left hand corner is shown also a single roller R for carrying the chain around the 90 degree curve and at the upper right hand corner is shown a multiple roller guide G2. In the lower right hand corner a single roller R is employed which completes the circuit of the conveyer chain.

In Figures 5 and 6 of the drawings are shown, on an enlarged scale, details of a guide of the multiple roller type above referred to. This particular guide is of the type shown in the upper right hand corner of the diagram Figure 4, where it is designated G2, three small rollers R' being employed for the 90 degree curve. 5 is the housing, preferably formed from a casting and having lugs 51, 52 secured by bolts 53, 54 and clip angles 55 to the casing C'. The casing at this point is provided with an opening through which projects a roller support 56 in which the pins 41, carrying the rollers R', are secured. The support 56, as will be seen from Figure 5, is spaced away from the inner face of the casing so that accumulation of dead material around the rollers is prevented as previously explained in regard to Figure 2 of the drawings. Upon the lower part of the support 56 is a V-shaped shroud 57 which diverts material from the rollers in the same manner as the shroud 22 shown in Figure 2 of the drawings, and to the same end. The back of the shroud extending between roller supports 56 is provided with a bevelled portion 58.

It will be seen from the drawing Figure 5 that, by removing the bolt 54, the housing 5 with the roller assembly may be swung outward from the casing in the direction of the arrow x so as to facilitate inspection, lubrication and repair. From this description, it is believed that the construction of the guide G', which has only two rollers, will be readily understood. It is believed also that the construction and mounting of the single rollers R, as indicated at various points, will be understood, the housings for the latter being substantially uniform except for the presence or absence of the shrouds 22. In this connection it may be necessary at certain points such as the lower right hand and upper left hand corners of Figure 4, where the roller is submerged in the full flow of material, to provide a renewable stripping plate fitting closely around the opening in the housing through which the roller projects to prevent choking of the space between the roller and the housing. This is shown in detail in Figures 9 and 9A in which W is the plate and W' the screws by which the stripping plate is secured to the housing 2 of the roller assembly.

Figure 21:
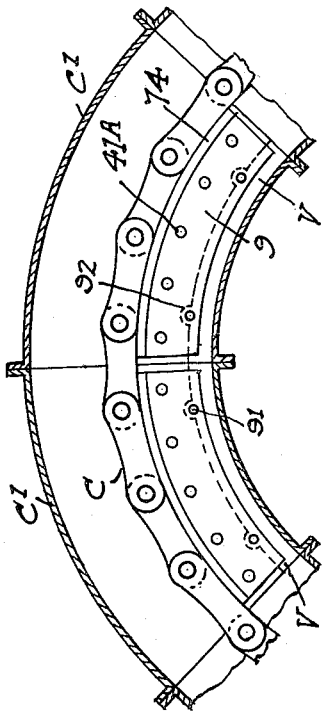
Figure 21 is a view corresponding to Figure 18 but having therein the solid slide castings which are interchangeable with the rollers of Figure 18.

Referring now to Figures 10 and 11 of the drawings which illustrate a simple form of horizontal conveyer constructed in accordance with my invention, but adapted for heavier duty than the examples above described, C12 is the lower horizontal run, being the loaded portion of the conveyer and travelling in the direction of the arrow 67, while C13 is the return run of the conveyer travelling in the direction of the arrow 68. D is the driving sprocket contained within the driving housing 45' in which is contained also the take-up sprocket 103 and the idler sprocket 104, the take-up sprocket 103 being carried upon one end 59 of a lever pivoted at 47, the said lever having at its other end a counter-weight 60, the whole operating in the manner well known in the art, the entire take-up mechanism being contained within the casing with the exception of the counter-weight and projecting end of the supporting lever. The sprocket D is driven from a motor in the usual manner. A lower curved portion C7 connects the lower run C12 of the conveyer with the housing 45' and the conveyer is fed from a hopper 69 through a suitable opening in the section 70 of the lower run, material thus fed from the conveyer being discharged from a hopper 71. After leaving the discharge hopper 71 the conveyer then being practically empty passes around the curved portion 72 to the upper run C13. The curved portion 72 is made up from 45 degree sections, similar to those shown in Figure 15 and to a larger scale in Figures 18 and 19, with the exception that the 45 degree section 73 in which, since no load is carried by the conveyer at that point, the anti-friction rollers are dispensed with and the conveyer chain is carried upon solid slide castings 74, as shown in Figures 16 and 17 and drawn to enlarged scale in Figure 21 of the drawings, the solid castings having an outer radius equal to the working radius of the chain as hereinbefore explained.

In Figures 12, 13 and 14 of the drawings is shown a simple form of vertical conveyer or elevator constructed in accordance with my invention. In this modification a short horizontal run C14 passes beneath and is fed by a track hopper T adapted to receive material from a railroad car shown thereabove, and the conveyer then passes upwards through a vertical flight C15 and an inclined flight C16 to another vertical flight C17 whence it passes around the curved portion 78 and downwards through a vertical flight C18 to the drive sprocket D and over the take-up sprocket 103 and the idler sprocket 104, and so around the curve 79 to the track hopper. The construction of the driving mechanism and its housing 45 is similar to that hereinbefore described, there being a counter-weight 60 operating to take up the slack of the chain, as will be understood.

Forming a part of the curved portion 78 of the conveyer is a 90 degree section 80, shown to a larger scale in Figure 15, in which the lower members of the conveyer casing are omitted so that the material, being carried upwards, is discharged through the openings so formed, the said material being received in the hopper 81 which projects laterally from the center line of the conveyer as indicated in Figure 13.

In Figure 14 is shown a transverse section taken on line 14—14 but drawn to an enlarged scale, showing the construction of the casing when the upper and lower runs are close together. This casing, as will be seen, comprises two channel-like sections having a flat partition plate between them, the whole being secured together by bolts, welding or other means.

Figure 19:
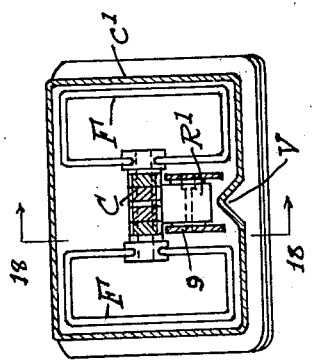
Figure 19 is a transverse section taken on line 19—19 of Figure 18.
Figure 20:
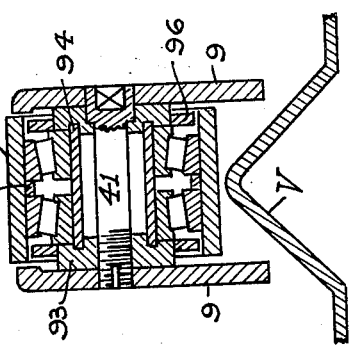
Figure 20 is a sectional view drawn to enlarged scale of the guide rollers shown in Figures 18 and 19.

In Figs. 18, 19 and 20 of the drawings are shown details of the construction employed for heavy duty work in which the conveyer chain is carried around curves upon multiple rollers in the same manner as in the guides G, G' above described, the curves, however, being of larger radius and containing more rollers. In this construction the casing C, made in 45 degree sections, has in its bottom wall a centrally disposed upwardly extending projection V, and over this section are located the rollers R' carried in spaced side bars 9. The side bars 9 are connected as by the bolts 91 to lugs or bosses 92 which project upwardly from the portion V of the casing. When the 45 degree sections of the casing are of cast iron, the section V and the lugs are cast in one piece with the same. The lugs, however, could obviously be welded to the section V at the required points, the essential feature being that the side bars are, for the most part of their length, spaced away from the lower face of the casing so that accumulation of material around the rollers is prevented, the whole of the material being kept in circulation by movement of the flights F which are omitted in the side view for the purpose of clearness. A 90 degree section such as just described can be mounted over a hopper 81 shown in Figure 15, the bottom wall of the casing in this case being omitted as therein shown.

In Figure 20 I have shown on a larger scale details of one form of anti-friction roller R' which may be used in these heavy duty guides. In this construction the central pivots 41 which are secured within the side plates carry flanges 93 having grooves adapted to receive an inner race support 94 of a taper roller bearing, the outer races of which are pressed tightly into the roller R', a spacer 95 being interposed between them, and upon the flanges 93 are positioned washers 96 of any suitable construction well known in the art having preferably packings, not shown, which exclude dust and dirt from the interior of the bearing.

When solid slide castings are used as explained in relation to Figures 16 and 17 of the drawings, the side bars 9 are retained as standard construction, being mounted upon the lugs 92 as above described, but instead of the rollers, solid slide castings 74 are interposed between the said side bars and secured by bolts 41A which take the place of the pivots 41 previously described.

While I have herein described and shown a preferred embodiment of my invention, it will be readily understood by those skilled in the art to which the same pertains that I may make various changes in detail to meet any particular or peculiar requirement without departing from the spirit of my invention as defined in the appended claims. For example, while I have in general shown the conduit as formed in standard straight sections and 45 degree curve sections, all of which are symmetrical about their center lines so as to be interchangeable and also reversible when worn so as to provide a fresh surface on the wearing side, it will be understood that I may in some cases make special conduits from sheet metal or other material. Further, where the rollers which guide the chain around curves are in general shown as mounted upon fixed studs, yet in some cases I may provide resilient means such as the springs W2 shown in Figure 9 of the drawings which allow the housing 2 to swing yieldingly around upon the pivot 3 in cases of momentarily excessive strain upon the propelling chain C.

Having thus described my said invention, what I claim and desire to secure by Letters Patent of the United States is:

1. In a conveyer, the combination, with a closed conduit having two portions angularly arranged with respect to one another and connected by a curved portion, of a conveyer chain operating in said conduit, and supporting means adapted to guide said chain around said curved portion, said means comprising one or more guide rollers within said conduit rotatably supported in members spaced away from the inner wall of the same, there being a swingable door in the wall of said conduit adapted to provide access to said supporting means.

2. In a conveyer, the combination, with a closed conduit having two portions angularly arranged with respect to one another and connected by a curved portion, of a conveyer chain operating in said conduit, and supporting means adapted to guide said chain around said curved portion, said means comprising one or more guide rollers within said conduit rotatably supported in members spaced away from the inner wall of the same, there being shroud means upon said members for directing material away from said roller or rollers.

3. In a conveyer, the combination, with a closed conduit having two portions angularly arranged with respect to one another and connected by a curved portion, of a conveyer chain operating in said conduit, and supporting means adapted to guide said chain around said curved portion, said means comprising one or more guide rollers within said conduit rotatably supported in members spaced away from the inner wall of the same, said members being mounted upon a swingable portion of said conduit, whereby said supporting means may be withdrawn from said housing.

4. In a conveyer, the combination, with a closed conduit having two portions angularly arranged with respect to one another and connected by a curved portion, of a conveyer chain operating in said conduit, and supporting means adapted to guide said chain around said curved portion, said means comprising one or more guide rollers within said conduit rotatably supported in members spaced away from the inner wall of the same, said members being mounted upon a resiliently held swingable portion of said conduit, whereby said supporting means may be protected from shocks and may be withdrawn from said housing.

HENRY W. HAPMAN.